US008981949B2

(12) United States Patent
Ricketts et al.

(10) Patent No.: US 8,981,949 B2
(45) Date of Patent: Mar. 17, 2015

(54) HARVESTER BIN SENSOR

(75) Inventors: Jonathan E. Ricketts, Ephrata, PA (US);
Brandon E. Ricketts, Marysville, OH (US); Wade L. Klennert, Albuquerque, NM (US)

(73) Assignee: CNH Industrial America LLC, New Holland, PA (US)

( * ) Notice: Subject to any disclaimer, the term of this patent is extended or adjusted under 35 U.S.C. 154(b) by 755 days.

(21) Appl. No.: 12/705,469

(22) Filed: Feb. 12, 2010

(65) Prior Publication Data
US 2011/0199221 A1   Aug. 18, 2011

(51) Int. Cl.
G08B 21/00 (2006.01)
A01D 41/127 (2006.01)
A01D 41/12 (2006.01)

(52) U.S. Cl.
CPC ........ A01D 41/1275 (2013.01); A01D 41/1208 (2013.01)
USPC ........... 340/617; 340/540; 340/548; 340/679; 340/684; 340/593; 340/856.2; 340/545.2; 460/1; 460/4; 460/5; 460/6; 460/119; 701/50; 702/25; 702/129

(58) Field of Classification Search
None
See application file for complete search history.

(56) References Cited

U.S. PATENT DOCUMENTS

| | | | |
|---|---|---|---|
| 2,780,689 A | 2/1957 | Cavera | |
| 3,882,887 A | 5/1975 | Rekai | |
| 4,206,452 A | 6/1980 | Blasucci | |
| 4,367,459 A | 1/1983 | Amir et al. | |
| 4,683,356 A | 7/1987 | Stoler | |
| 4,829,286 A | 5/1989 | Zvi | |
| 4,829,287 A | 5/1989 | Kerr et al. | |
| 4,910,498 A * | 3/1990 | Feher | 340/556 |
| 4,920,336 A | 4/1990 | Meijer | |
| 5,176,573 A | 1/1993 | Dow | |
| 5,529,537 A * | 6/1996 | Johnson | 460/6 |
| 5,922,030 A * | 7/1999 | Shank et al. | 222/56 |
| 6,176,779 B1 | 1/2001 | Riesterer et al. | |
| 6,583,721 B1 | 6/2003 | Dank et al. | |
| 6,891,472 B2 | 5/2005 | Tallman | |
| 6,925,871 B2 | 8/2005 | Frank | |
| 7,164,119 B2 | 1/2007 | Iwasawa | |
| 7,275,357 B2 | 10/2007 | Covington et al. | |
| 7,339,474 B2 | 3/2008 | Easley et al. | |
| 7,468,660 B2 | 12/2008 | Griffin et al. | |
| 2003/0076118 A1* | 4/2003 | Adams et al. | 324/664 |
| 2004/0113780 A1* | 6/2004 | Pottratz | 340/550 |
| 2007/0279223 A1 | 12/2007 | Chiu | |
| 2009/0096240 A1* | 4/2009 | Hanzel | 296/37.8 |
| 2010/0285855 A1* | 11/2010 | Chervenka et al. | 460/119 |
| 2012/0253611 A1* | 10/2012 | Zielke et al. | 701/50 |

* cited by examiner

Primary Examiner — Benjamin C. Lee
Assistant Examiner — Curtis King
(74) Attorney, Agent, or Firm — Seyed V. Sharifi T.; Patrick M. Sheldrake

(57) ABSTRACT

A harvester grain bin monitoring system is disclosed. The system includes a sensor that monitors the perimeter of the bin proximate to the top rim to provide a warning to an operator when the grain level reaches approaches the bin rim. The sensor may be optical or mechanical.

9 Claims, 8 Drawing Sheets

HARVESTER BIN SENSOR

FIELD OF THE INVENTION

The present invention relates generally to crop gathering devices. It relates more particularly to a grain bin monitoring sensor for a harvester.

BACKGROUND OF THE INVENTION

It has long been a problem of harvesting equipment to determine the amount of grain which has been stored within the bin of the combine. Initially, it was necessary for the operator to turn around and physically took into the grain bin to determine the level of grain. As the cost of crop production rises, any spillage of grain becomes more and more expensive for the farmer, and it becomes more critical to ensure that the grain bin does not overflow onto the ground. Additionally, many harvesters now utilize grain bin extensions, making the bin taller than the top of the cab, and thereby preventing viewing of the grain level from within the cab.

Various monitoring systems are now available for harvesters which are much more effective than requiring the operator to physically view the contents of the combine grain bin. A majority of the most common monitoring systems utilize a mechanical switch or float within the grain bin that triggers a light or warning device for the operator. However, these devices measure the level at a point in the bin, and are ineffective in determining the crop level when the crop flows around the mechanical sensor rendering it immobile, or when gravity forces the crop away from the sensor.

There is a need for an improved monitoring system for harvester grain bins.

SUMMARY OF THE INVENTION

The present disclosure relates to a harvester including a grain bin having an interior surface, a top surface, and an interior surface having a perimeter at a predetermined distance from the top surface, a monitoring system, and a control system. The monitoring system includes a sensor system that is activated by the presence of grain at the perimeter of the grain bin. The control system provides an alarm signal to an operator when the sensor is activated.

The present disclosure further relates to a monitoring system for a grain bin. The monitoring system includes a sensor system, a control system, and a plurality of positioning devices. The sensor system includes a sensor and a sending unit. The sensor is activated by the presence of grain at a perimeter of the grain bin. The control system provides an alarm signal to an operator when the sensor is activated. The plurality of positioning devices position the sensor around the perimeter of the grain bin and at a predetermined distance below a top surface of the grain bin.

The present disclosure yet further relates to a method of monitoring the fill level of a harvester grain bin. The method includes the step of positioning a sensor around a perimeter of the harvester grain bin. The sensor is activated upon grain reaching a position along the perimeter.

One advantage of the present disclosure is to provide an improved crop monitoring system for harvesters.

Another advantage of the present disclosure is to provide a monitoring system that provides a warning prior to spillage from any perimeter location on a harvester grain bin.

Another advantage of the present disclosure is to provide a harvester grain bin monitoring system that is simple to install, economical to manufacture, and easy to use.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
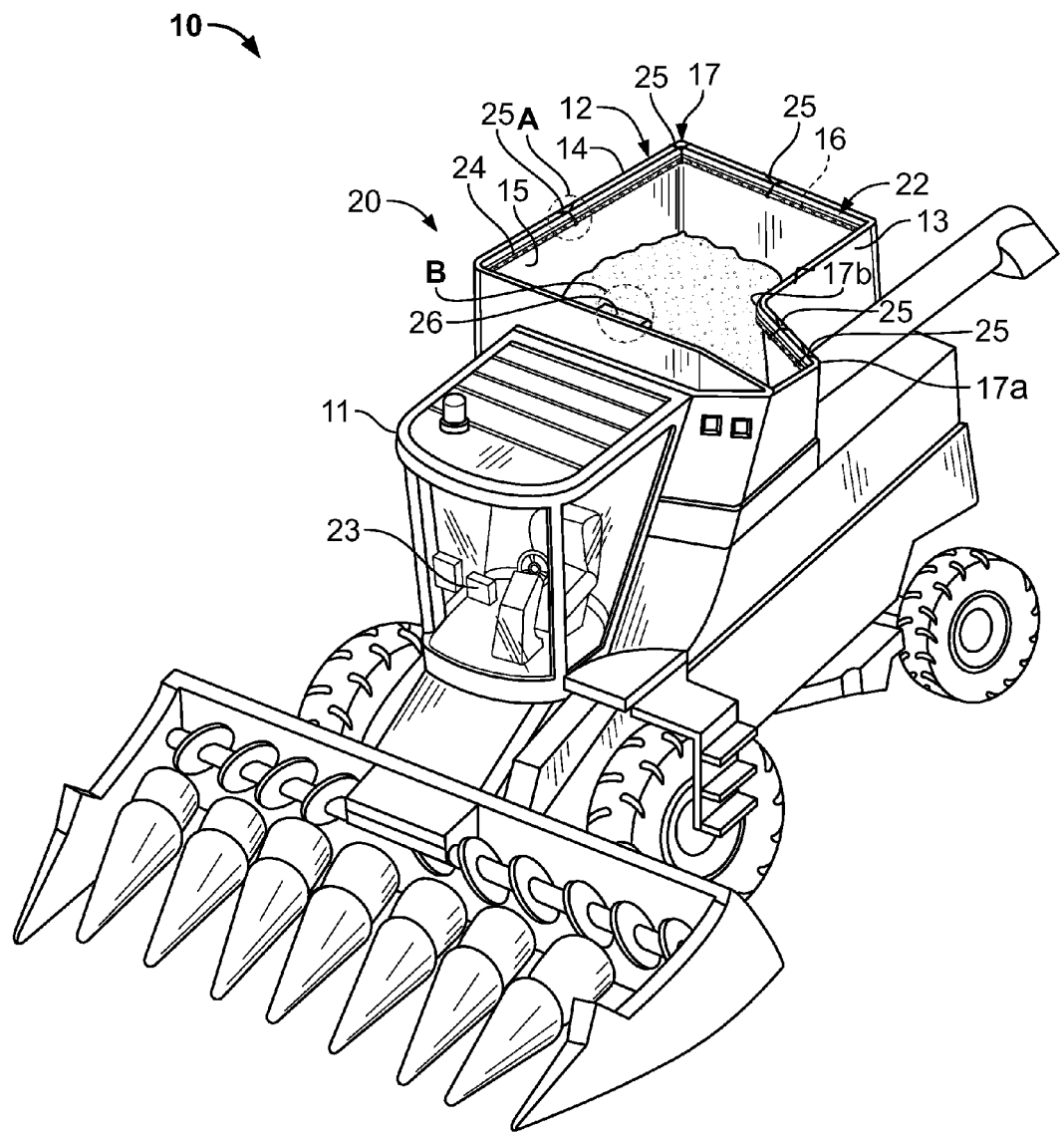
FIG. 1 is a top perspective view of an embodiment of a combine with a monitoring system according to the present disclosure.

FIG. 1 shows a harvester 10 including an embodiment of a grain bin monitoring system (monitoring system) 20 according to the disclosure. The harvester 10 further includes a cab 11 and a grain bin 12. In this exemplary embodiment, the harvester 10 is a combine, however, in other embodiments, the harvester 10 may be an agricultural vehicle having a harvested crop storage bin, cart, container or other crop containing area.

The grain bin 12 includes walls 13 including a top surface 14 and an inside surface 15. The walls 13 adjoin at corners 17. A perimeter 16, indicated by the dashed line, is located around the inside surface 15 at a first predetermined distance D (FIG. 3) below the top surface 14.

The monitoring system 20 includes a sensor system 22 mounted within the grain bin 12 and a control system 23 mounted in the cab 11. In this exemplary embodiment, the monitoring system 20 may be referred to as a mechanical monitoring system, as the monitoring system 20 is triggered by mechanical force applied by the grain to the sensor system 22. The sensor system 22 includes a sensor 24, a plurality of positioning devices 25, and a sending unit 26. The sensor 24 conforms to the perimeter 16 at the predetermined distance D (FIG. 3) from the top surface 14. The sensor 24 conforms by positioning of the sensor 24 by the plurality of positioning devices 25.

Figure 2:
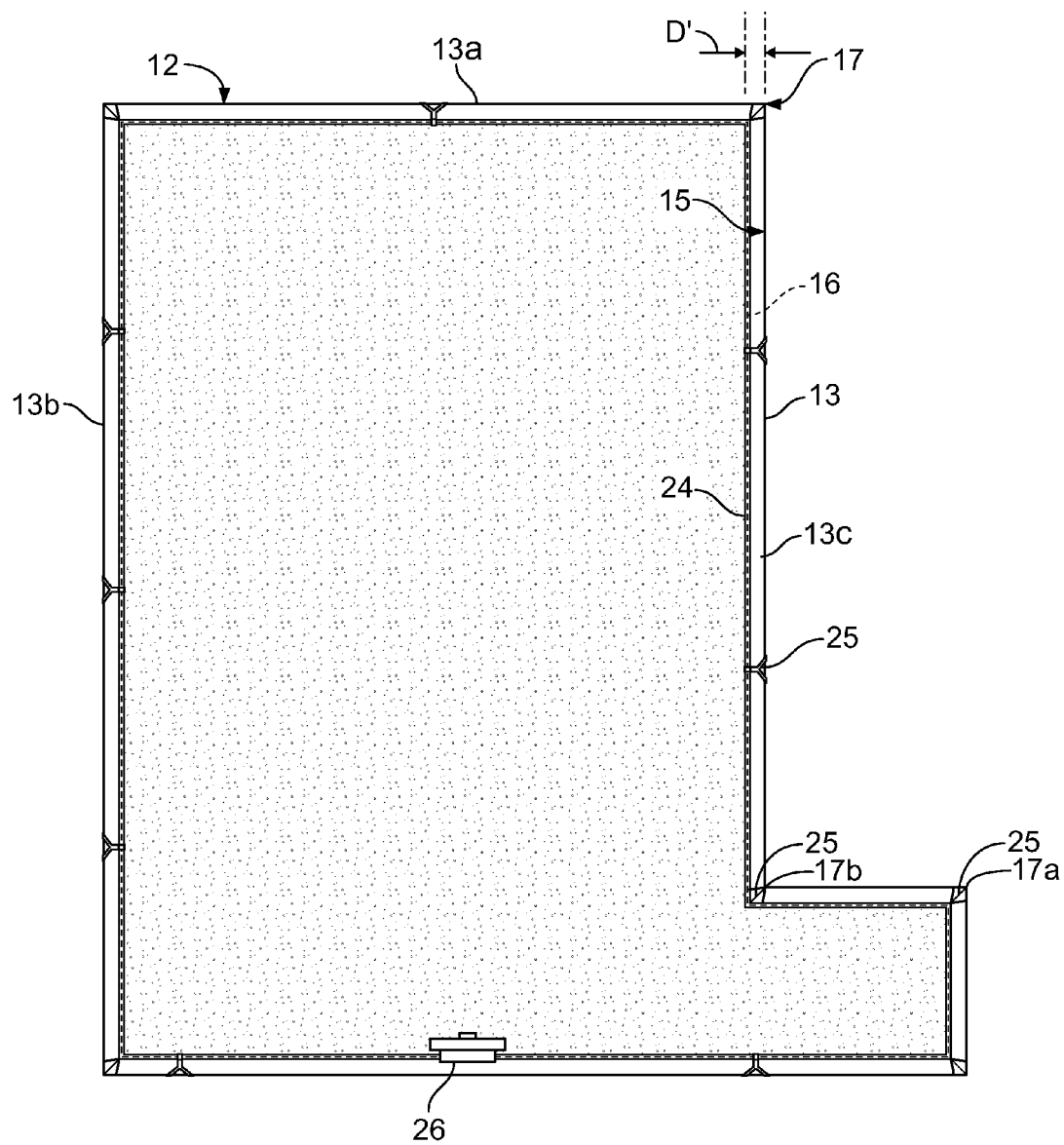
FIG. 2 is a top view of the grain bin of the combine in FIG. 1. of the present invention.

FIG. 2 shows a top view of grain bin 12. As can be seen in FIG. 2, the plurality of positioning devices 25 position the sensor 24 at a second predetermined distance D' from the inside surface 15 of wall 13. The plurality of positioning devices 25 include positioning devices configured to attach to straight portions 13c of wall 13, outside corners 17a and inside corners 17b. In other embodiments, the plurality of positioning devices 25 may include positioning devices configured to position sensor 24 at a fixed position D from wall 13 along any geometric shape of wall 13, including, but not limited to curved, undulating, and ribbed geometries.

Figure 3:
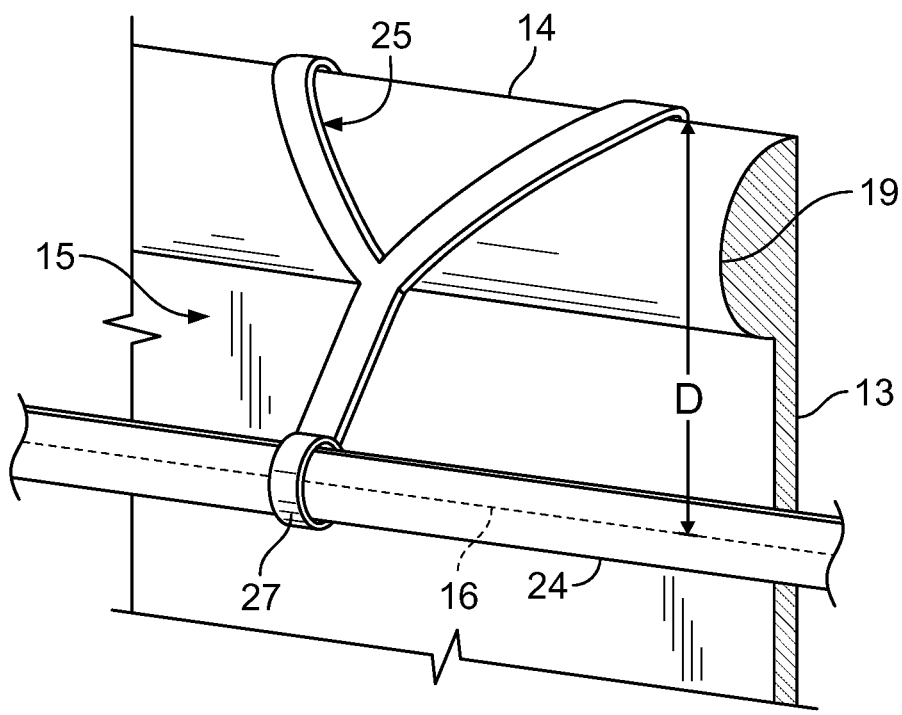
FIG. 3 is a detailed perspective view of portion "A" of FIG. 1.
Figure 3A:
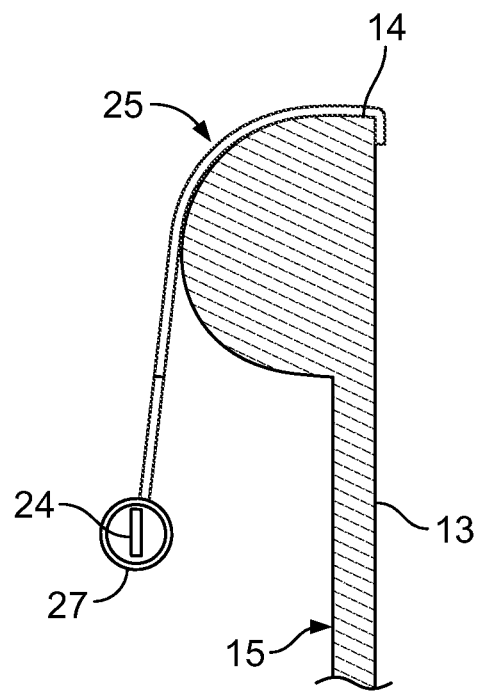
FIG. 3A is a detailed side view of portion "A" of FIG. 1.

FIGS. 3 and 3A shows a more detailed view of portion "A" of FIG. 1. As can be seen in FIG. 3, the walls 13 further include a rim 19. In another embodiment, the walls 13 may not include a rim 19. The sensor 24 is mounted proximate to the top and inside surfaces 14, 15 and around the perimeter 16 by the plurality of positioning devices 25 to determine when the grain bin 12 is approximately full. In this exemplary embodiment, the sensor 24 is a flexible ribbon. As used herein, the term "flexible" means that the sensor 24 substantially conforms to the perimeter 16 of the bin 12 when positioned by the plurality of positioning devices 25.

The sensor 24 may be formed of a metal, polymer, plastic, composite or other similar flexible material. In another embodiment, the sensor 24 may be, but not limited to, a wire, cable, tape, or other flexible member. The term "proximate to" means less than about 10 inches below the top surface 14 and less than about 10 inches away from the inside surface 15. In another embodiment, the sensor 24 is located less than about 8 inches below and away from the top and/or inside surfaces 14, 15, respectively. In another embodiment, the sensor 24 is located less than about 6 inches below and away from the top and/or inside surfaces 14, 15, respectively. In another embodiment, the sensor 24 is located less than about 4 inches below and away from the top and/or inside surfaces 14, 15, respectively. In another embodiment, the sensor 24 is located less than about 2 inches below and away from the top and/or inside surfaces 14, 15, respectively. In another embodiment, the sensor 24 is located approximately equal to the top surfaces 14.

In this exemplary embodiment, the sensor system 22 includes a single sensor 24, a plurality of positioning devices 25 and a sending unit 26 that cover the entire perimeter 16 of the grain bin 12. In another embodiment, the sensor system 22 may include two or more sensors 24, plurality of positioning devices 25 and sending units 26 that cover different portions of the perimeter 16. For example, a the sensor system 22 may include a first sensor 24, a first plurality of positioning devices 25, and a first sending unit 26 that cover the perimeter 16 along a first wall or rear wall 13a (FIG. 2) and a second sensor 24, second plurality of positioning devices 25, and a second sending unit 26 that cover the perimeter 16 along a second wall 13b. In yet another embodiment, the sensor system 22 may include two or more sensors 24, plurality of positioning devices 25, and sending units 26 that cover all or a portion of the perimeter 16.

In another embodiment, the sensor system 22 may include two or more sensors 24 and associated plurality of positioning devices 25 and sending units 26 located at different predetermined distances from the top surface 14. In such a manner, the sensor system 22 may monitor when the grain bin is at various percent of full conditions. For example, the sensor system 22 may include a first sensor 24, first plurality of positioning devices 25 and first sending unit 26 located proximate the top surface 14 to monitor a full grain bin condition, and a second sensor 24, second plurality of positioning devices 25 and second sending unit located at a distance from the top surface 14 corresponding to a ¾ full grain bin condition. In yet another embodiment, the sensor system 22 may include two or more sensors 24, plurality of positioning devices 25 and sending units 26 located at various distances from the top surface 14 to monitor various percentage of full bin condition, for example, but not limited to 50%, 75%, 90% and 100% full grain bin condition.

As can be further seen in FIG. 3, the positioning devices 25 allow for the free movement of sensor component 24 therethrough. In this exemplary embodiment, the positioning devices 25 are clips that attach to the top surface 14 of grain bin 12. The positioning devices 25 include an eyelet 27 that permit the sensor 24 substantially free movement therethrough. The positioning devices 25 may be configured to attach to the grain bin 12 along walls 13 and/or at corners 17.

In another embodiment, the positioning devices 25 may be hooks, loops, eyehooks, pulleys or other fastening devices that allow for the free movement of the sensor 24. In one embodiment, the positioning devices 25 are formed of a resilient material that attach or clip to the grain bin 12. In another embodiment, the positioning devices 25 are attached to the grain bin by fasteners, such as, but not limited to screws, pins and/or clamps. In one embodiment, the positioning devices 25 may me releasably attached to the grain bin 12.

Figure 4:
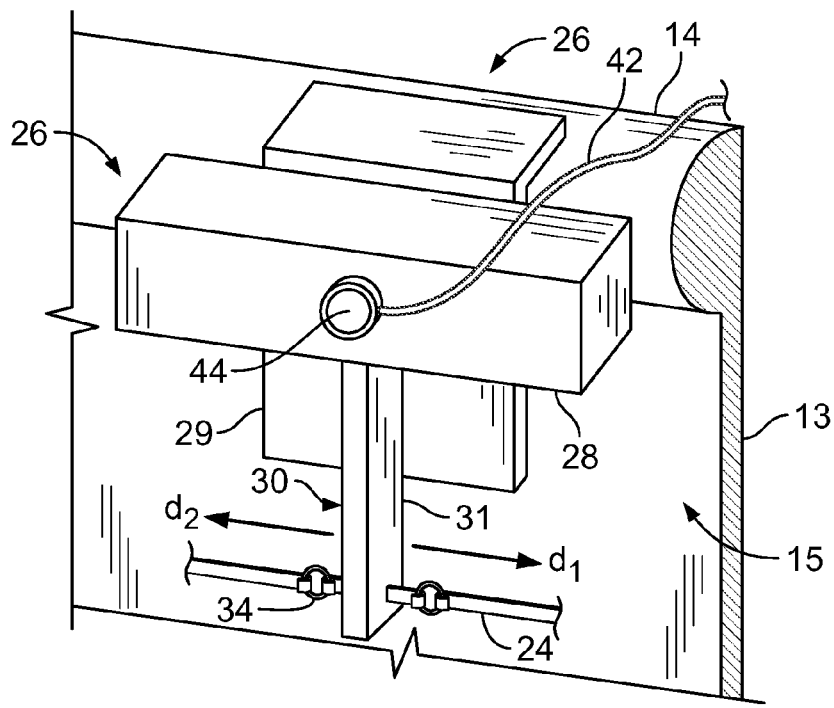
FIG. 4 is a detailed perspective view of portion "B" of FIG. 1.
Figure 4A:
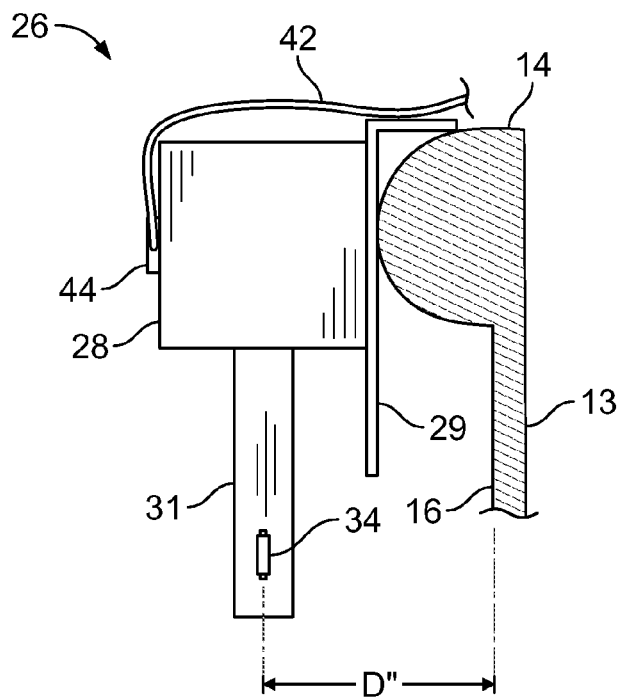
FIG. 4A is a detailed side view of portion "B" of FIG. 1

FIGS. 4 and 4A shows a more detailed view of portion "B" of FIG. 1. As can be seen in FIGS. 4 and 4A, the sending unit 26 includes a sending unit housing 28 and a switch device 30. In this exemplary embodiment, the sending unit 26 includes an optional mounting unit 29. The mounting unit 29 is attached to the top and/or inside surfaces 14, 15 of the bin 12 by welding, brazing or other similar joining technique. In another embodiment, the mounting unit 29 is attached to the top and/or inside surfaces 14, 15 by fasteners such as, but not limited to, screws, bolts, clamps and pins.

The sending unit housing 28 includes a switch or other mechanically activated electrical component (not shown) that is activated by a pivotal displacement of the switch device 30 by a predetermined amount. Upon activation, the sending unit 26 sends an electrical signal to the control system 23 via cable 42. The cable 42 is connected by terminal 44 to the sending unit housing 28. The cable 42 also provides electric power to the switch. In another embodiment, the sending unit 26 may include another cable or power source to provide electrical power to the switch. In yet another embodiment, the switch may be battery powered. In another embodiment, the sending unit 26 may include a wireless device, such as a Bluetooth™ or other similar wireless device, for transmitting an electrical signal to the control system 23.

The switch device 30 includes a shaft 31 and attachment components 34. The shaft 31 is pivotally connected to the sending unit housing 28 such that movement of the shaft 31 by the sensor 24 in either the $d_1$ or $d_2$ direction by a predetermined amount activates the switch (not shown) in the sending unit housing 28.

The attachment components 34 connect the sensor component 24 to the shaft 31. The sensor 24 may be releasably connected to the attachment components 34. In this exemplary embodiment, the attachment components 34 are eyelets, however, in other embodiments, the attachment components 34 may be selected from the group including, but not limited to hooks, clamps, pins or other similar fasteners.

Figure 5:
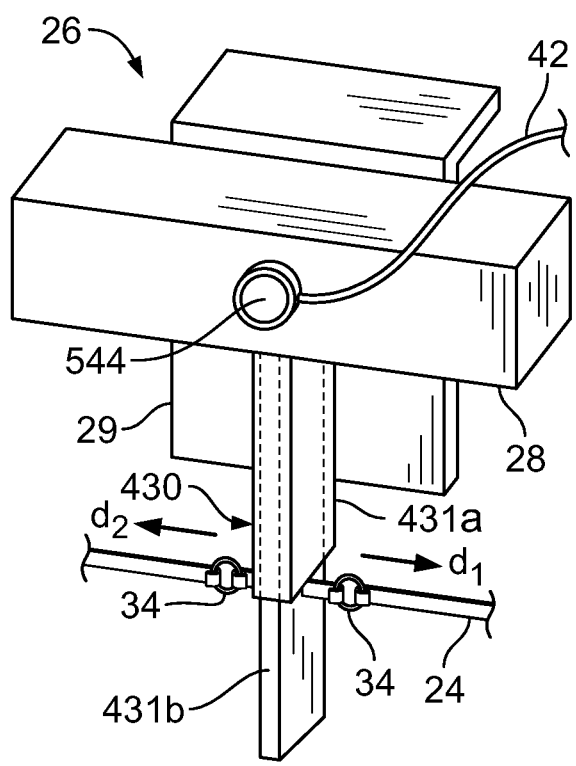
FIG. 5 shows an embodiment of sending unit according to the disclosure.

FIG. 5 shows another embodiment of sending unit 526. In this exemplary embodiment, the sending unit 26 includes a switch device 430 includes a first shaft 431a and a second shaft 431b. The first shaft 431a surrounds the second shaft 431b, and the second shaft 431b extends from the first shaft 431a. This embodiment of the switch device 430 may be referred to as a shaft-in-shaft embodiment. In one embodiment, the first and second shafts 431a, 431b are formed of an electrically conductive material, for example, a metal, and are electrically isolated from one another. The first and second shafts 431a, 431b are electrically connected to the switch (not shown) within the sending unit housing 28 in such a manner that movement of the first shaft 431a in the $d_2$ direction and/or movement of the second shaft 431b in the $d_1$ direction by a predetermined distance causes the first and second shafts 431a, 431b to electrically contact, thereby activating the switch.

Referring again to FIG. 1, the control system 23 includes a display (not shown) for providing a visual and/or audible alarm that the sensor system 22 has been activated indicating that grain has reached a predetermined level within the grain bin 12. In this exemplary embodiment, the control system 23 is located within the cab 11, however, in other embodiments, the control system 23 may be located within and or outside the cab 11. The control system 23 is configured to display or provide a visual and/or audible alarm from one or more sending units 26. The control system 23 may further include an operator data entry device, such as a keyboard or touch screen, for entering parameters such as, but not limited to commands, data bases and operational parameters to the control system 20.

Figure 6:
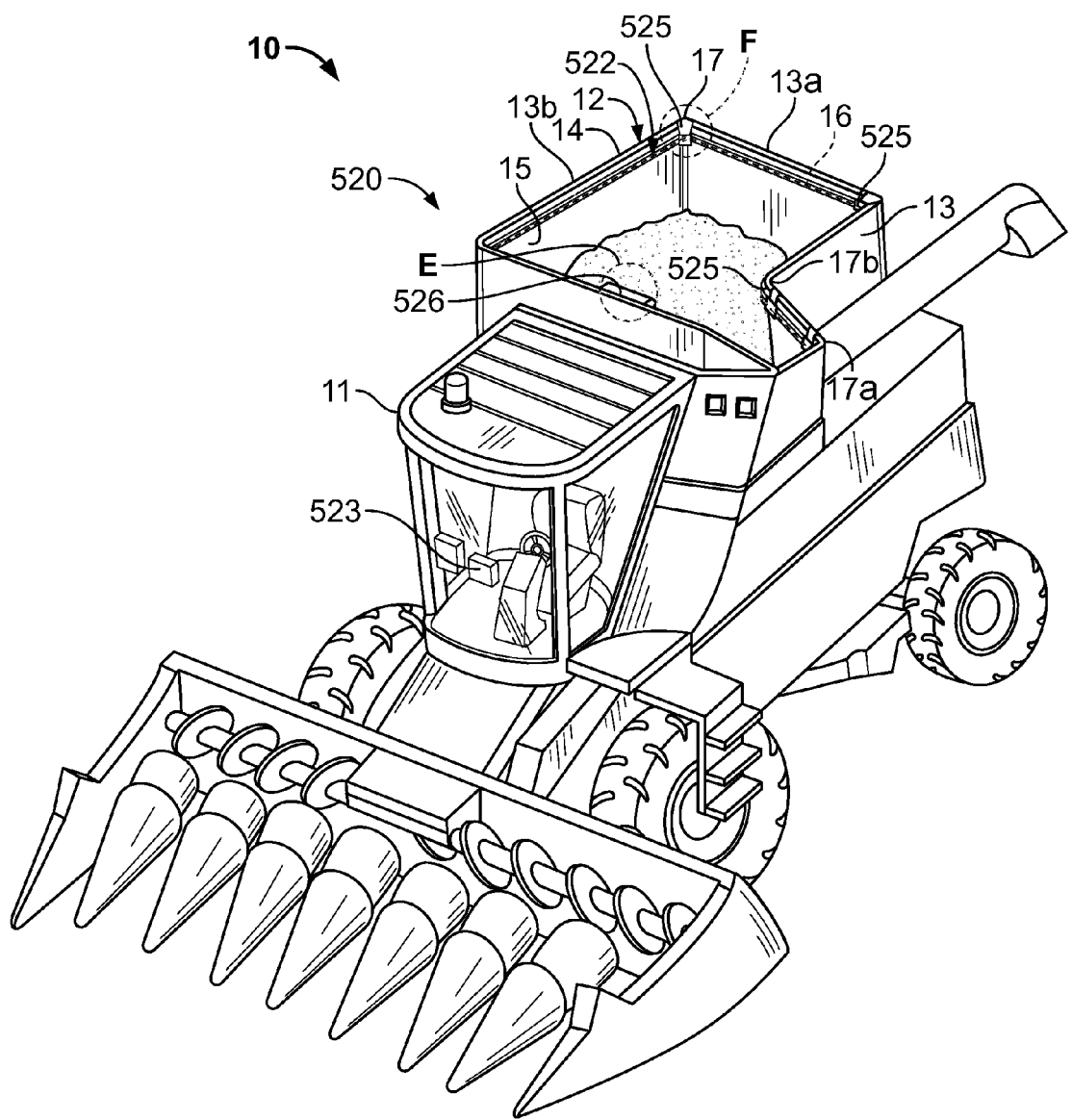
FIG. 6 shows a top perspective view of another embodiment of a combine with a monitoring system according to the present disclosure.

FIG. 6 shows another embodiment of a monitoring system 520 according to the disclosure. As can be seen in FIG. 6, the monitoring system 520 includes a sensor system 522 and a control system 523. The sensor system 522 includes a plurality of reflecting devices 525 and a sending unit 526 for directing a light beam along perimeter 16. In this exemplary embodiment, the monitoring system 520 may be referred to as an optical monitoring system, as the monitoring system 520 is triggered by grain interfering with a light beam transmitted around the perimeter 16.

Figure 7:
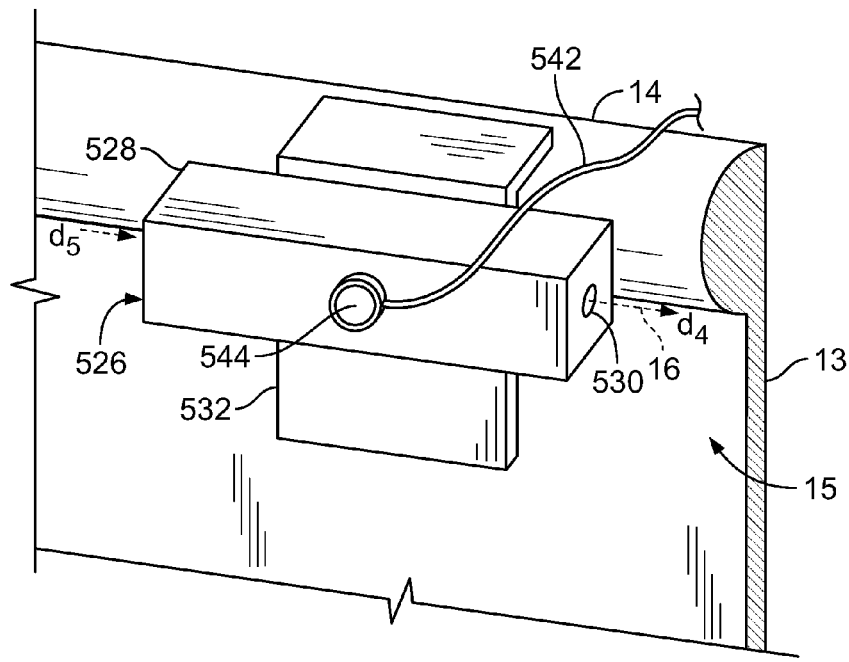
FIG. 7 shows another embodiment of a sending unit according to the disclosure.

FIG. 7 shows a more detailed portion "E" of FIG. 6. As can be seen in FIG. 7, the sending unit 526 includes a sending unit housing 528 containing a light beam generator (not shown). The light beam generator directs a light beam through a first aperture 530 along perimeter 16 in first direction $d_4$. The sending unit housing 528 also includes a second aperture (not shown) on the side of sending unit housing 528 opposite first aperture 530 for receiving the light beam from a second direction $d_5$. The first and second directions $d_4$, $d_5$ conform to the perimeter 16 (FIG. 6). The sending unit housing 528 also includes an optical switch (not shown) configured to send an electric signal via electric cable 542 to control system 526 upon the interruption of the light beam being received by the sending unit 526. A cable 542 provides a data connection between the sending unit 526 and the control system 523 to inform the sending unit 526 of an interruption in the light beam.

The cable 542 may also provides electrical power to the light beam generator. The cable 542 is connected to the sending unit 526 by terminal 544. In another embodiment, power may be provided to the light beam generator by another cable or a power source. In yet another embodiment, the light beam generator may be battery powered. In another embodiment, the sending unit 526 may include a wireless device, such as a Bluetooth™ or other similar wireless device, for transmitting the electrical signal to the control system 523. The light beam generator may be a laser generator, an infrared generator, an optical light beam generator or other beam generator sufficient to generate a focused beam capable of traveling the perimeter 16 and being detected by the sending unit 526.

In this exemplary embodiment, the sending unit 526 includes an optional mounting unit 532. The mounting unit 532 is attached to the top and/or inside surfaces 14, 15 of the bin 12 by welding, brazing or other similar joining technique. In another embodiment, the mounting unit 532 is attached to the top and/or inside surfaces 14, 15 by fasteners such as, but not limited to, screws, bolts, clamps and pins.

Figure 8:
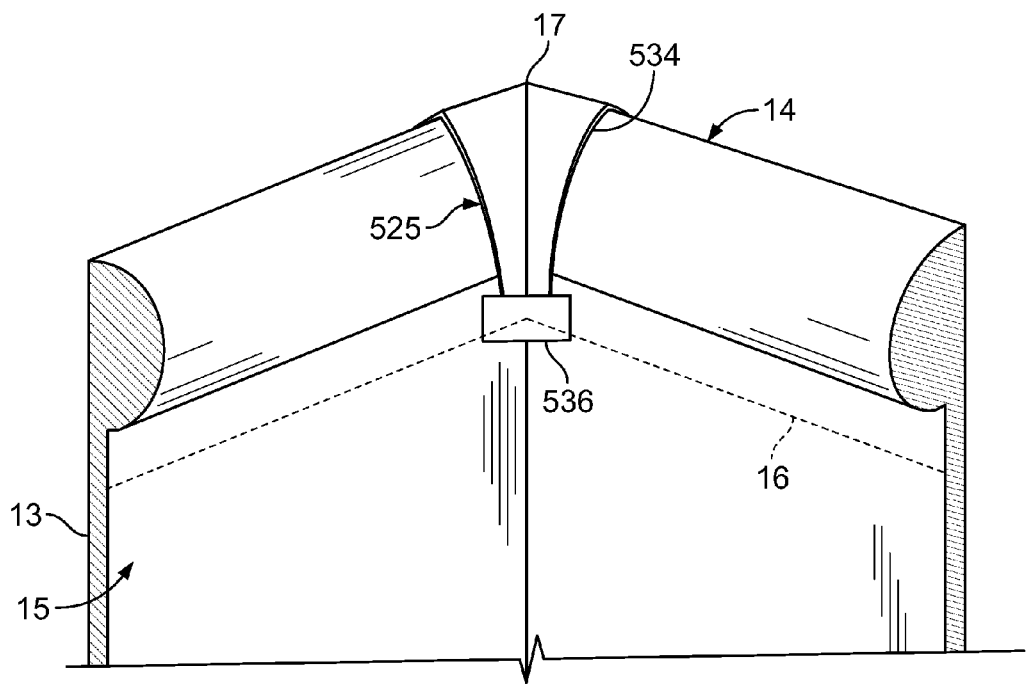
FIG. 8 shows another embodiment of a positioning device according to the present disclosure.

FIG. 8 shows a more detailed portion "F" of FIG. 6. As can be seen in FIG. 8, the positioning device 525 includes a fastener 534 and a reflective member 536. The positioning device 525 is positioned at corner 17 to reflect the light beam around the perimeter 16 (FIG. 6). The fastener 534 attaches the positioning device 525 to the top and/or inside surfaces 14, 15 of grain bin 12 (FIG. 6). In another embodiment, the positioning device 525 may include fasteners such as, but not limited to, screws, bolts, clamps and pins to attach the positioning device 525 to the top and/or inside surfaces 14, 15. In yet another embodiment, the positioning device may be attached to the top and/or inside surfaces 14, 15 of the bin 12 by welding, brazing or other similar joining technique. The reflective member 536 directs the light beam along the perimeter 16. The reflective member 536 may is a polished member, mirror or other reflective device selected to reflect the type of light beam emitted by the sending unit 526.

Figure 9:
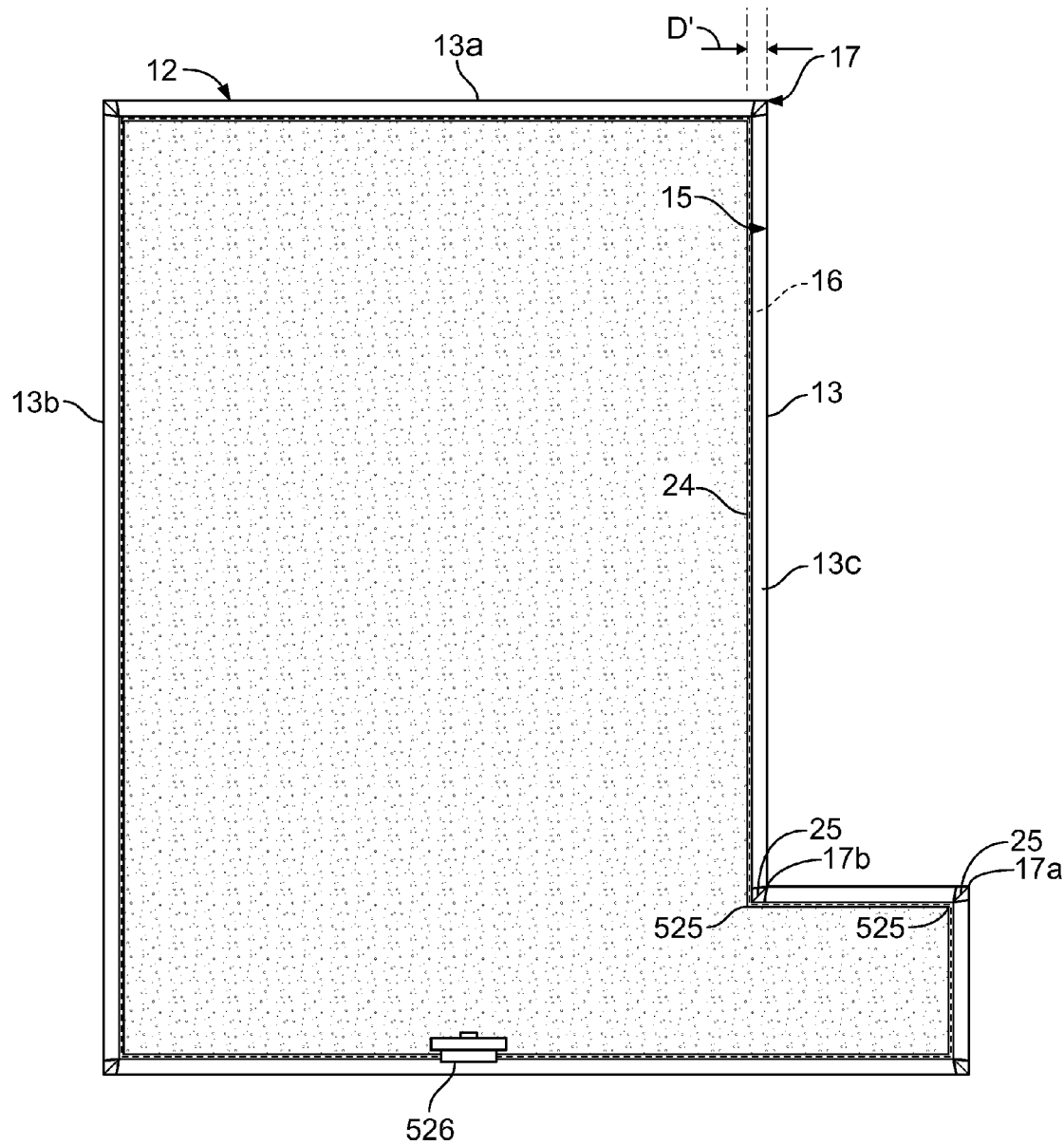
FIG. 9 shows a top view of the grain bin of the combine of FIG. 6. of the present invention.

As shown in FIG. 9, the plurality of positioning devices 525 reflect the light beam around perimeter 16 at a predetermined distance D' from the inside surface 15 of wall 13. The reflective member 536 is oriented to direct the light beam along the perimeter 16. The plurality of positioning devices 525 include positioning devices configured to attach to outside corners 17a and inside corners 17b, and have reflective members 535 likewise configured to reflect the light beam along outside and inside corners 17a, 17b. For example, the positioning device 525 shown in FIG. 8 is configured to reflect the light beam along an outside corner 17a. In other embodiments, the plurality of positioning devices 525 may include positioning devices configured to direct the light beam at an approximate fixed position D along wall 13 including any geometric shape of wall 13, including, but not limited to curved, undulating, and ribbed geometries.

Referring again to FIG. 7, the sending unit 526 is mounted proximate to the top and inside surfaces 14, 15. In this manner, the light beam follows the perimeter 16 proximate to the top and inside surfaces 14, 15. Grain reaching the perimeter 16 located proximate to the top and inside surfaces 14, 15 and interrupting the light beam as it travels the perimeter 16 indicates an approximately full bin condition. The term "proximate to" means less than about 10 inches below the top surface 14 and less than about 10 inches away from the inside surface 15. In another embodiment, the sending unit 526 is located less than about 8 inches below and away from the top and/or inside surfaces 14, 15, respectively. In another embodiment, the sending unit 526 is located less than about 6 inches below and away from the top and/or inside surfaces 14, 15, respectively. In another embodiment, the sending unit 526 is located less than about 4 inches below and away from the top and/or inside surfaces 14, 15, respectively. In another embodiment, the sending unit 526 is located less than about 2 inches below and away from the top and/or inside surfaces 14, 15, respectively. In another embodiment, the sending unit 526 is located approximately equal to the top surface 14.

In this exemplary embodiment, the sensor system 522 includes a single sending unit 526 and plurality of reflecting devices 525 that provide a light beam that covers the entire perimeter 16 of the grain bin 12. In another embodiment, the sensor system 522 may include two or more sending units 526, and plurality of reflecting devices 525 that cover different portions of the perimeter 16. For example, a the sensor system 522 may include a first sending unit 526 and a first plurality of reflecting devices 525 that cover the perimeter 16 along a first wall or rear wall 13a (FIG. 6) and a second sending unit 526 and second plurality of reflecting devices 525 that cover the perimeter 16 along a second wall 13b (FIG. 6). In yet another embodiment, the sensor system 522 may include two or more sending units 526 and plurality of reflecting devices 525 that cover all or a portion of the perimeter 16.

In another embodiment, the sensor system 522 may include two or more sending units 526 and associated plurality of reflecting devices 525 located at different predetermined distances from the top surface 14. In such a manner, the sensor system 522 may monitor when the grain bin is at various percent of full conditions. For example, the sensor system 522 may include a first sending unit 526 and first plurality of reflecting devices 525 located proximate the top surface 14 to monitor a full grain bin condition, and a second sending unit 526 and second plurality of reflecting devices 525 located at a distance from the top surface 14 corresponding to a ¾ full grain bin condition. In yet another embodiment, the sensor system 522 may include two or more sending units 526, and plurality of reflecting devices 525 located at various distances from the top surface 14 to monitor various percentage of full bin condition, for example, but not limited to 50%, 75%, 90% and 100% full grain bin condition.

Referring again to FIG. 6, the control system 523 includes a display (not shown) for providing a visual and/or audible alarm that the sensor system 522 has been activated indicating that grain has reached a predetermined level within the grain bin 12. In this exemplary embodiment, the control system 523 is located within the cab 11, however, in other embodiments, the control system 523 may be located within and or outside the cab 11. The control system 523 is configured to display or provide a visual and/or audible alarm from one or more sending units 526.

In another embodiment, a monitoring system (not shown) is provided that includes both a mechanical and an optical sensor system. For example, the monitoring system may include a mechanical sensor system at a first predetermined distance from the top surface 14 and an optical sensor system at a second predetermined distance from the top surface 14. In another example, the monitoring system may include a mechanical sensor system at a first portion of the perimeter 16 and an optical sensor system at a second portion of the perimeter 16.

According to an embodiment of method of operation of the monitoring system 20, combine 10 harvests grain into the grain bin 12. When grain reaches any position along the perimeter 16 at a predetermined distance D from the top surface 14, the sensor system 22 is activated by the grain and sends an electronic signal to the control system 23. In one embodiment, the grain acts upon the sensor 24 by sufficiently displacing or otherwise sufficiently moving the sensor 24 to activate the sending unit 26. The sending unit 26 transmits a signal to the control system 23, which activates a visual and/or audible alarm for the operator, indicating that the grain bin is approaching or has approached capacity.

According to another embodiment of method of operation of the monitoring system 520, when grain reaches a predetermined level in the grain bin 12 at any position along the perimeter 16 at a predetermined distance D from the top surface 514, the grain interrupts a light beam emitted from the sending unit 526, thereby activating the sending unit 526. The sending unit 526 transmits a signal to the control system 523, which activates a visual and/or audible alarm for the operator, indicating that the grain bin is approaching or has approached a predetermined capacity, for example, but not limited to 50%, 75%, 90% and 100% capacity.

According to yet another embodiment of method of operation of a monitoring system, grain reaches a predetermined level in the grain bin 12 at any position along the perimeter 16 and activates either a mechanical or optical monitoring system thereby transmitting a signal to the control system 23, 523 and providing an alarm to an operator indicating grain has reached a predetermined capacity, for example, but not limited to 50%, 75%, 90% and 100% capacity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A harvester, comprising:
a grain bin having an interior surface, a top surface, wherein the interior surface has a perimeter that is positioned at a predetermined distance from the top surface; and
a mechanical monitoring system, comprising:
a sensor system disposed continuously around the perimeter of the interior surface of the grain bin, wherein the sensor system is activated by a movement induced by a presence of grain at the perimeter of the grain bin; the sensor system including a flexible ribbon moveable in response to a mechanical force applied by the grain in the grain bin; the sensor system conforms to a predetermined non-linear perimeter of the inner surface for the grain bin, the predetermined perimeter in form of one of a curving or modulating perimeter of the grain bin,
a control system that provides an alarm signal to an operator when the sensor is activated, and
a positioning device that positions the sensor system on the perimeter at the predetermined distance below the top surface, to cover an entire of the perimeter, or a portion thereof, for determination of fullness of bin capacity, the positioning device enables a free movement of the flexible ribbon therein.

2. The harvester of claim 1, further comprising a plurality of positioning devices for positioning the flexible ribbon at the predetermined distance from the top surface.

3. A mechanical monitoring system for a grain bin, comprising:
a sensor system that is activated by a movement induced by grain on a flexible ribbon that conforms to a predetermined non-linear perimeter of an inner surface for the grain bin, the predetermined perimeter in form of one of a curving or undulating perimeter of the grain bin,
a control system that provides an alarm signal to an operator when the sensor is activated, and;
a plurality of positioning devices for positioning the sensor continuously around the perimeter of the grain bin and at a predetermined distance below a top surface of the grain bin; the plurality of positioning devices facilitate evaluation of fullness capacity that is determined based on: all of the perimeter at the predetermined distance of the grain bin, or alternatively a portion of the perimeter at the predetermined distance below the surface of the grain bin, each of the plurality of the positioning device enables a free movement of the flexible ribbon therein.

4. The system of claim 3, wherein the flexible ribbon is in form of a wire, or a cable or a tape.

5. The system of claim 3, wherein the flexible ribbon is formable from a polymer or a plastic or a metal.

6. The system of claim 3, wherein the positioning devices are clips attachable to a top surface of the grain bin.

7. A method of monitoring a fill level of a harvester grain bin, comprising:
- positioning a sensor continuously around a perimeter of the harvester grain bin; the sensor in form of a flexible ribbon that conforms to a predetermined non-linear perimeter of an inner surface for the grain bin, the predetermined perimeter having a form of one of a curving or modulating perimeter of the grain bin,
- inducing a mechanical force on the flexible ribbon via a movement of the grain in the harvester grain bin;
- determining a capacity for the grain bin at a plurality of levels, in-part via a positioning device that positions the sensor on the perimeter at a predetermined distance below a top surface of the harvester grain bin, to cover an entire of the perimeter, or a portion thereof, the positioning device enables a free movement of the flexible ribbon therein.

8. The method of claim 7, wherein an alarm signal is transmitted to a control unit when the sensor is activated.

9. The method of claim 8, wherein the control unit activates a visual or audible alarm after receiving the alarm signal.

\* \* \* \* \*